(12) United States Patent
Herzog

(10) Patent No.: US 7,544,918 B2
(45) Date of Patent: Jun. 9, 2009

(54) CONVEYOR SPEED MONITOR

(76) Inventor: Kenneth J. Herzog, 200 Mill Rd., Riverhead, NY (US) 11901-3125

( * ) Notice: Subject to any disclaimer, the term of this patent is extended or adjusted under 35 U.S.C. 154(b) by 443 days.

(21) Appl. No.: 10/860,756

(22) Filed: Jun. 2, 2004

(65) Prior Publication Data

US 2006/0151478 A1 Jul. 13, 2006
US 2006/0273080 A9 Dec. 7, 2006

Related U.S. Application Data

(60) Provisional application No. 60/572,027, filed on May 17, 2004.

(51) Int. Cl.
*H05B 6/16* (2006.01)
*F27B 9/06* (2006.01)

(52) U.S. Cl. ..................... 219/653; 219/388

(58) Field of Classification Search ............. 219/653, 219/654, 655, 656, 657, 658, 388, 700, 775
See application file for complete search history.

(56) References Cited

U.S. PATENT DOCUMENTS

| 4,017,704 A * | 4/1977 | Collins et al. .......... 219/660 |
| 4,288,673 A * | 9/1981 | Ishibashi ............... 219/653 |
| 5,092,446 A * | 3/1992 | Sullivan et al. ......... 198/323 |
| 5,237,143 A * | 8/1993 | Scheuchzer ............. 219/635 |
| 5,844,501 A * | 12/1998 | El-Ibiary ............ 340/870.11 |
| 5,952,796 A * | 9/1999 | Colgate et al. ............ 318/1 |
| 6,069,558 A * | 5/2000 | Kershaw ............... 340/435 |
| 2003/0042248 A1 * | 3/2003 | Witt et al. ............. 219/497 |

* cited by examiner

*Primary Examiner*—Daniel L Robinson
(74) *Attorney, Agent, or Firm*—Ostrolenk, Faber, Gerb & Soffen, LLP

(57) ABSTRACT

An induction sealer system which includes a speed monitor to ensure proper sealing of containers.

16 Claims, 7 Drawing Sheets

CONVEYOR SPEED MONITOR

CLAIM OF PRIORITY AND RELATED APPLICATIONS

The present application is based on and claims priority to U.S. Provisional Application No. 60/572,072, filed on May 17, 2004, in the name of Kenneth J. Herzog, and entitled A BAR GRAPH DISPLAY, AN IR THERMOMETER, AND A SPEED SENSOR WHICH CAN BE USED INDIVIDUALLY OR IN COMBINATION WITH AN INDUCTION SEALER, the disclosure of which is hereby incorporated by reference.

This application is related to U.S. application Ser. No. 10/860,753, filed on Jun. 2, 2004, in the name of Kenneth J. Herzog, and entitled BAR GRAPH, the disclosure of which is hereby incorporated by reference.

This application is also related to U.S. application Ser. No. 10/859,830, filed on June 2, 2004, in the name of Kenneth J. Herzog, and entitled INDUCTION SEALER SYSTEM WITH TEMPERATURE SENSOR, the disclosure of which is hereby incorporated by reference.

FIELD OF THE INVENTION

The present invention relates to induction sealer systems and more particularly to an induction foil system that includes a speed sensor.

BACKGROUND OF THE INVENTION

Induction foil cap sealers are well known. Referring to FIG. 1, a prior art induction foil cap sealer includes induction head 10 which includes a plurality of field coils 12. In operation, field coils 12 receive an electrical current which causes the development of magnetic fields that project away from field coils 12. The projected magnetic fields are schematically shown as circular lines surrounding field coils 12 for illustration purposes only. The magnetic fields projecting from field coils 12 are used for sealing a cap onto an opening of a bottle in the following manner.

Cap 14 is mechanically coupled to the opening of bottle 16 and placed under induction head 10. Due to the mechanical coupling between cap 14 and bottle 16, metallic foil 18, which is received in cap 14, is pressed between the end of cap 14 and the sealing edge of the opening of bottle 16. Included inside cap 14 is polymer sealing film 17 which is interposed between metallic foil 18 and the opening of bottle 16. Optionally, wax layer 20 and pulp board liner 22 are also included in cap 14 and sandwiched between metallic foil 18 and the closed end of cap 14.

To effect the seal, magnetic fields that project from field coils 12 permeate cap 14 and cause foil 18 to heat up. The heat so generated causes polymer sealing film 17 to melt and thus seal metallic foil 18 to the opening of bottle 16. As a result, a hermetic seal between metallic foil 18 and bottle 16 is obtained which can survive the removal of cap 14. If optional wax layer 20 is used, the generated heat melts wax layer 20 further enhancing the hermetic effect.

Induction head 10 may assume any number of shapes depending on the type of cap used. FIGS. 2A-2C illustrate three examples of induction heads.

Assuring the quality of the hermetic seal is commercially important. For example, when the content of a container is medicine, it is important for the consumer to know that the container has been sealed since leaving the manufacturer's plant. Otherwise, a consumer may suspect tampering and return the product, which results in the increase in the overall cost to the manufacturer. In addition, a hermetic seal may be required to keep the content of a container unexposed to environmental factors such as moisture in order to avoid damage to the content. In either case, assessing the quality of the seal before the container leaves the manufacturer is of great interest.

Several factors affect the quality of the seal. One factor is the amount of time a container is exposed to induction heating. If the amount of time is too short, a good seal may not be obtained. If the amount of time is too long, there may be overheating, which can damage the container, the seal, the product, and the sealing head itself.

The amount of exposure time is directly related to how fast a container passes under induction head 10. Thus, the speed of the carrying platform which carries the container, e.g. a conveyor belt, is important in attaining a good induction seal.

It would be desirable to have an induction sealing system and an induction sealing method that can monitor the amount of induction exposure in order to produce a good seal quality.

SUMMARY OF THE INVENTION

It is an object of the present invention to provide an induction sealing system and method in which the speed of the carrying platform is monitored to ensure that the containers carried thereon receive an optimum exposure to the induction heating in order to obtain a good seal quality.

According to the present invention an induction sealing system includes a conveyor belt which carries the containers that are to be sealed, and a speed monitor which monitors the speed of the conveyor belt.

According to one aspect of the present invention the speed of the conveyor belt as determined by the speed monitor is compared to a desired speed. If the speed of the conveyor belt is determined to be outside of a designated range, a fault signal is generated which in turn activates a warning signal generator to alert the operator of the system.

In the preferred embodiment of the present invention, an optical encoder is operatively connected to the conveyor belt in order to determine the speed of the conveyor belt. Preferably, when the speed of the conveyor belt exceeds 5% of the desired speed, or falls below 5% of the desired speed a fault signal is generated. The fault signal is then used to trigger the activation of a warning signal generator such as an alarm or a strobe light.

Other features and advantages of the present invention will become apparent from the following description of the invention which refers to the accompanying drawings.

DETAILED DESCRIPTION OF THE FIGURES

Referring to FIGS. 3A-3E, an induction sealing system according to the present invention includes an induction sealer unit 30 which includes induction head 10, which is not shown in FIGS. 3A-3E, but examples of which can be seen in FIGS. 1, and 2A-2C. Induction head 10 of induction sealer unit 30 is preferably positioned over conveyor belt 32. Conveyor belt 32 is used to transport containers (e.g. bottles) that are to be subjected to induction heating under induction head 10 of induction sealer unit 30.

An induction sealing system according to the present invention further includes a speed sensor. The speed sensor senses the speed of conveyor belt 32 and reports the same to induction sealer unit 30.

Figure 1:
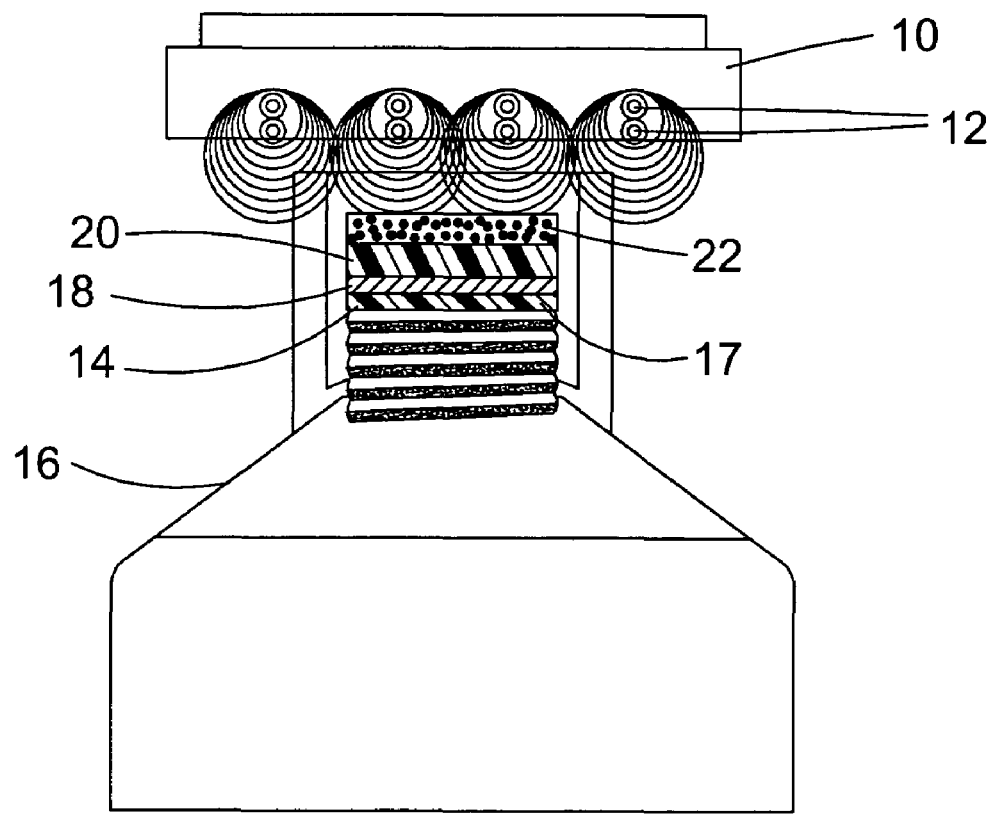
FIG. 1 schematically illustrates sealing by induction heating according to prior art.
Figure 2A:
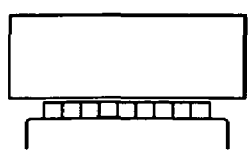
FIGS. 2A-2C schematically show a number of sealing head configurations according to the prior art.
Figure 2B:
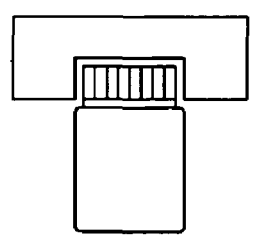
Figure 2C:
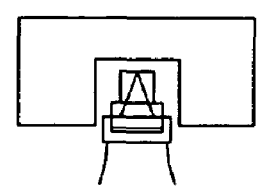
Figure 3A:
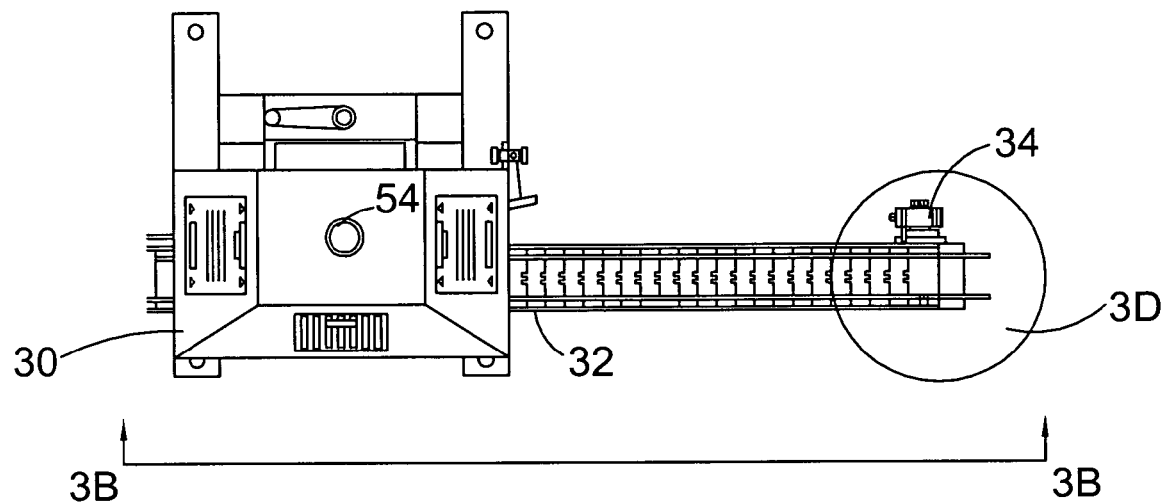
FIG. 3A shows a top plan view of an induction sealing system according to the present invention.
Figure 3B:
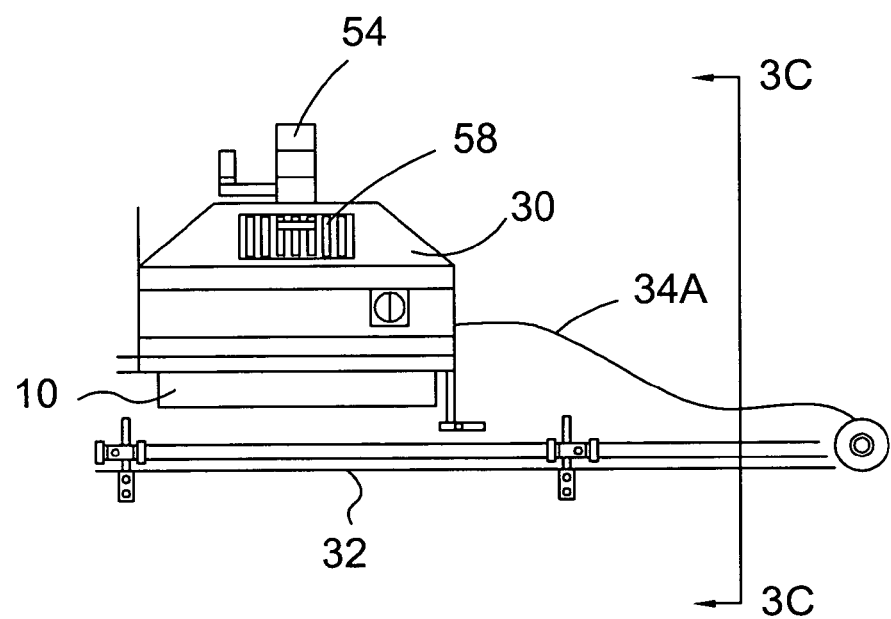
FIG. 3B shows a front plan view of an induction sealing system along line 3B-3B in FIG. 3A viewed in the direction of the arrows.
Figure 3C:
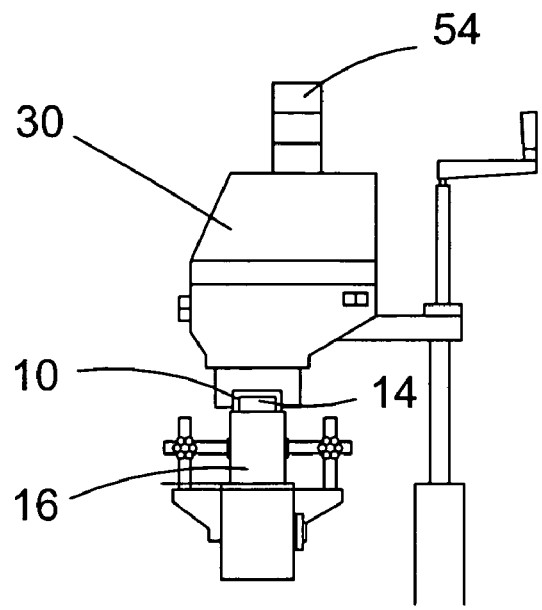
FIG. 3C shows a side plan view of an induction sealing system along line 3C-3C in FIG. 3B viewed in the direction of the arrows.
Figure 3D:
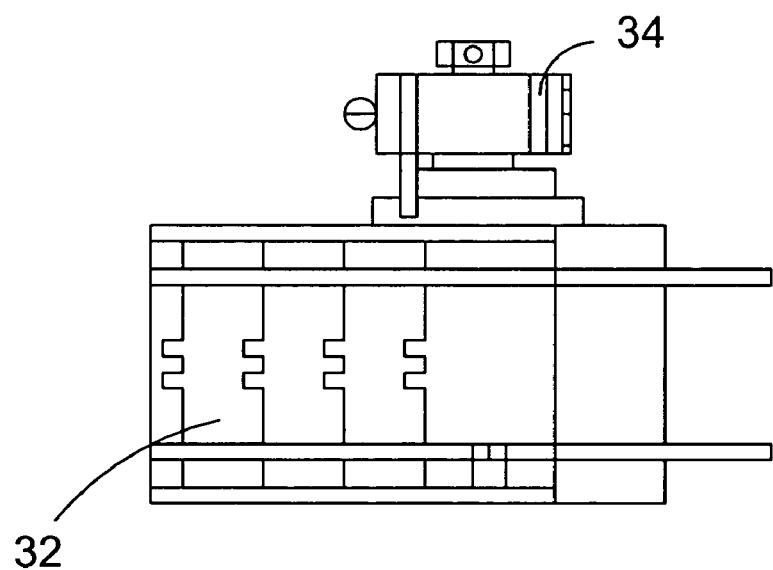
FIG. 3D shows an enlarged view of portion 3D in FIG. 3A.
Figure 3E:
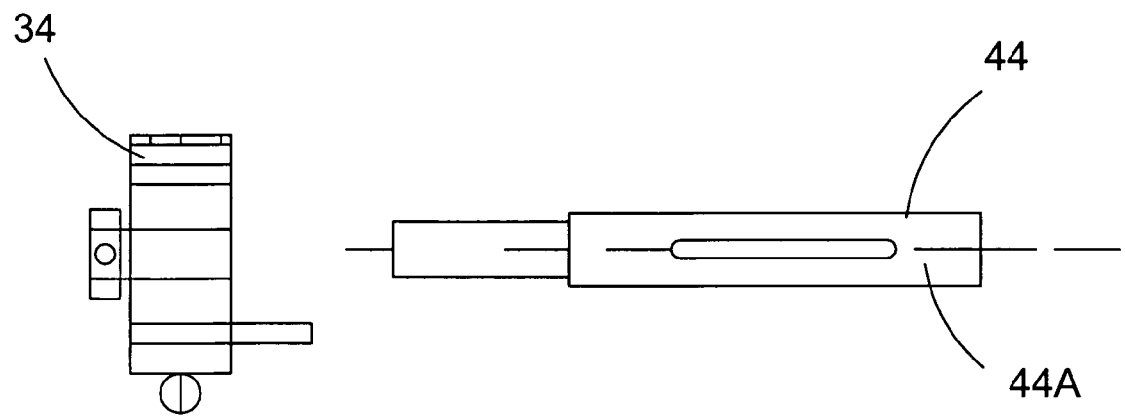
FIG. 3E shows an optical encoder and a drive shaft components of an induction sealer system according to the present invention.
Figures 4A, 4B:
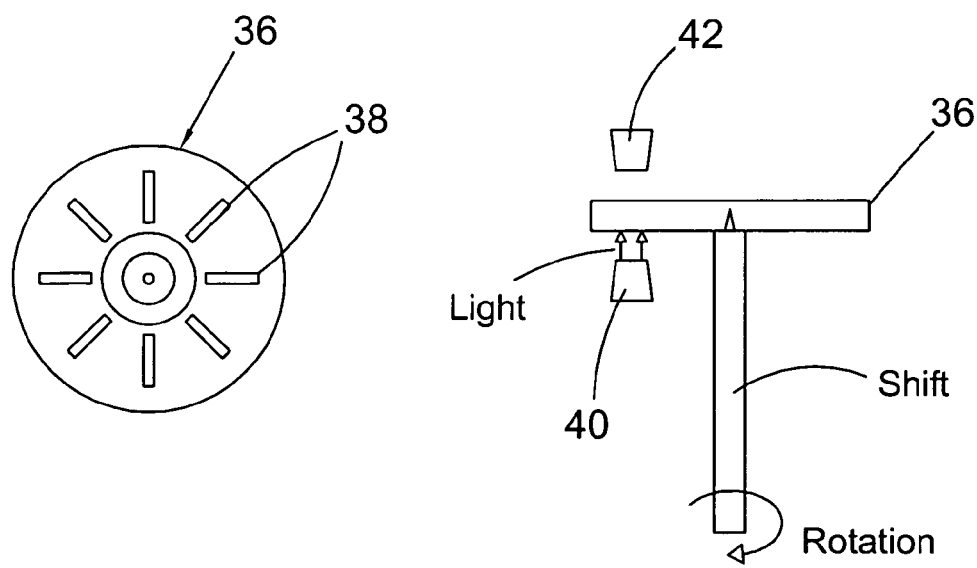
FIG. 4A shows a front view of an optical encoder plate as may be used in an optical encoder according to the preferred embodiment of the present invention.
FIG. 4B schematically illustrates the various components of an optical encoder.

The speed sensor in the preferred embodiment of the present invention includes optical encoder 34. An optical encoder is a common device for measuring the speed of, for example, a motor or a wheel. Referring to FIGS. 4A and 4B, a typical optical encoder includes encoder disk 36, which is connected to a shaft such that the central axis of the shaft is in registration with the center of encoder disk 36. Encoder disk 36 includes a plurality of spaced slots 38 wide enough to allow the passage of light. Slots 38 are normally spaced at regular intervals.

A typical optical encoder further includes light source 40, which may be an infrared emitting diode, disposed at one side of encoder disk 36, and light detector 42, which may be an infrared phototransistor, disposed at the other side of encoder disk 36 in order to receive the light from light source 40. The body of encoder disk 36 is not transparent to the light so that when encoder disk 36 is rotated light only passes through slots 38 and is received by light detector 42. Each time light is received by light detector 42 a signal is produced which is usually referred to as a tic.

The duration of time between the tics indicates the speed of the rotation of encoder disk 36. Thus, the faster encoder disk 36 rotates the shorter the time between the tics. In addition, the number of tics is indicative of the total displacement.

In a typical application, a microprocessor 48 (FIG. 5) receives the tics from encoder 34 periodically, thereby decoding the speed of encoder disk 36. Thus, for example, knowing that 500 tics corresponds to one foot of displacement can be used by a microprocessor to conclude that 500 tics received in one second corresponds to the average speed of 1 foot per second.

Referring back to FIGS. 3A-3E, optical encoder 34 in the preferred embodiment is operatively connected to drive shaft 44. Drive shaft 44 is operatively connected to conveyor belt 32, whereby the motion of the rotating drive shaft turns the sprocket which moves conveyor belt 32.

The rotation of drive shaft 44 about its central axis 44A causes the rotation of encoder disk 36 (FIGS. 4A-4B) of optical encoder 34. The rotation of encoder disk 36 produces tics which are transmitted via encoder transmission wire 34A to induction sealer unit 30.

Figure 5:
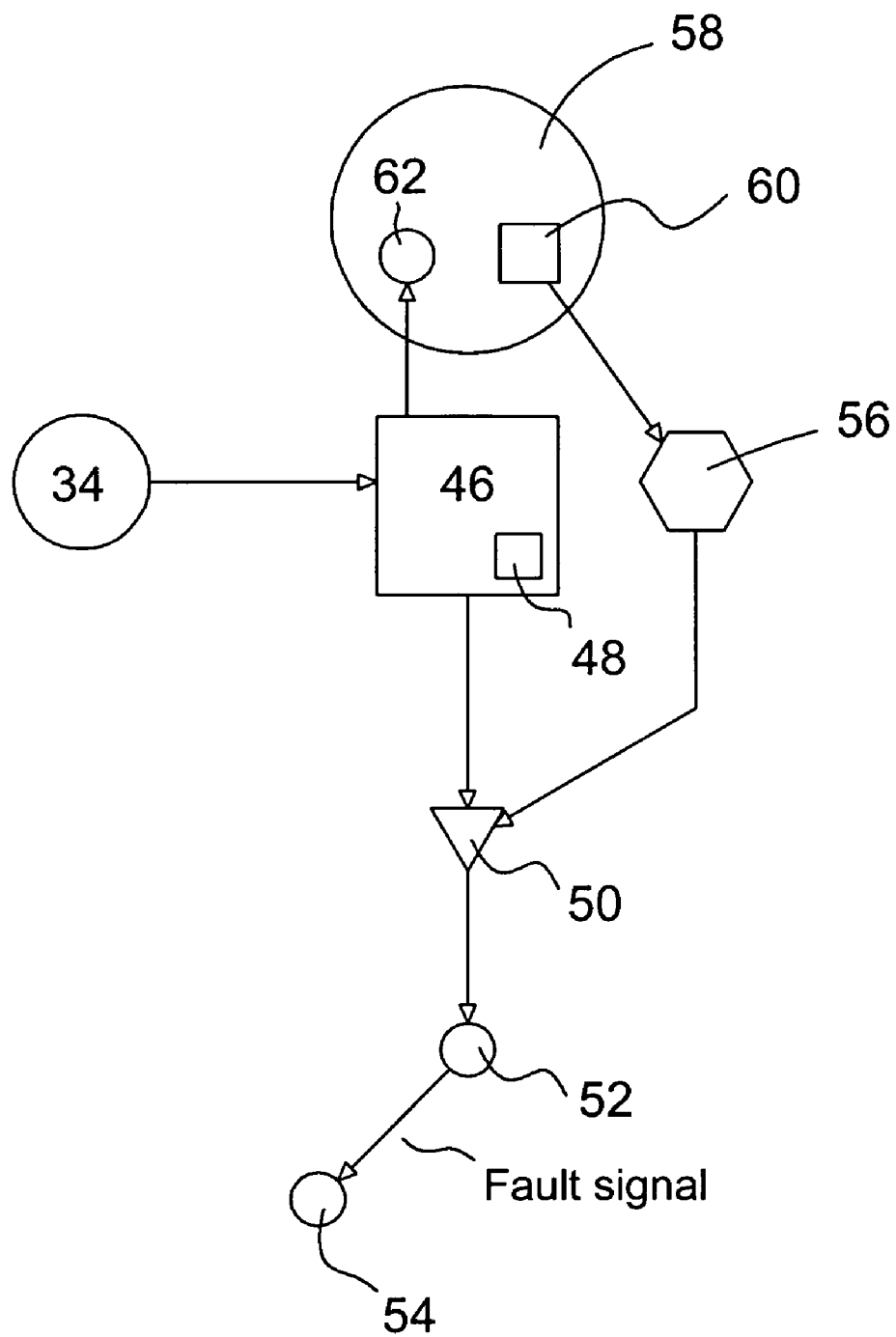
FIG. 5 illustrates an induction sealer system according to the present invention.

Referring to FIG. 5, induction sealer unit 30 includes speed monitor 46. Speed monitor 46 includes microprocessor 48 which receives the tics from optical encoder 34 and calculates the speed of the conveyor belt 32. A suitable microprocessor may be a 16 bit micro-controller such as a PIC processor available from Microchip Technology Inc.

Induction sealer head 30 further includes comparator 50 which compares the speed of conveyor belt 32 to a predetermined desired speed in order to determine whether the speed of conveyor belt 32 falls within an acceptable range. For example, comparator 50 compares the speed of conveyor belt 32 to the desired speed to determine whether the speed is not more than 5% of the desired speed and not less than 5% of the desired speed.

If the speed of conveyor belt 32 is outside an acceptable range, signal generator 52 in induction sealer unit 30 generates a fault signal.

The fault signal is sent to warning signal generator 54 which in turn generates a warning signal. Warning signal generator may be an audio signal generator, for example, an alarm and/or an optical signal generator, for example, a strobe light. Optionally, a gate may be provided to prevent containers from passing under induction sealer head 30.

In the preferred embodiment of the present invention, the desired speed is retained in electronic memory location 56, retrieved from the electronic memory location 56 and compared to the conveyor speed that is determined by speed monitor 46. The latter steps can be carried out periodically, for example, every fifteen second, or can be carried out after a predetermined number of tics have been counted. The conveyor constant (explained later) can be used to convert the number of tics to the number of feet. The conversion can be carried out by software. Electronic memory location 56 may be suitable memory device.

Figure 6:
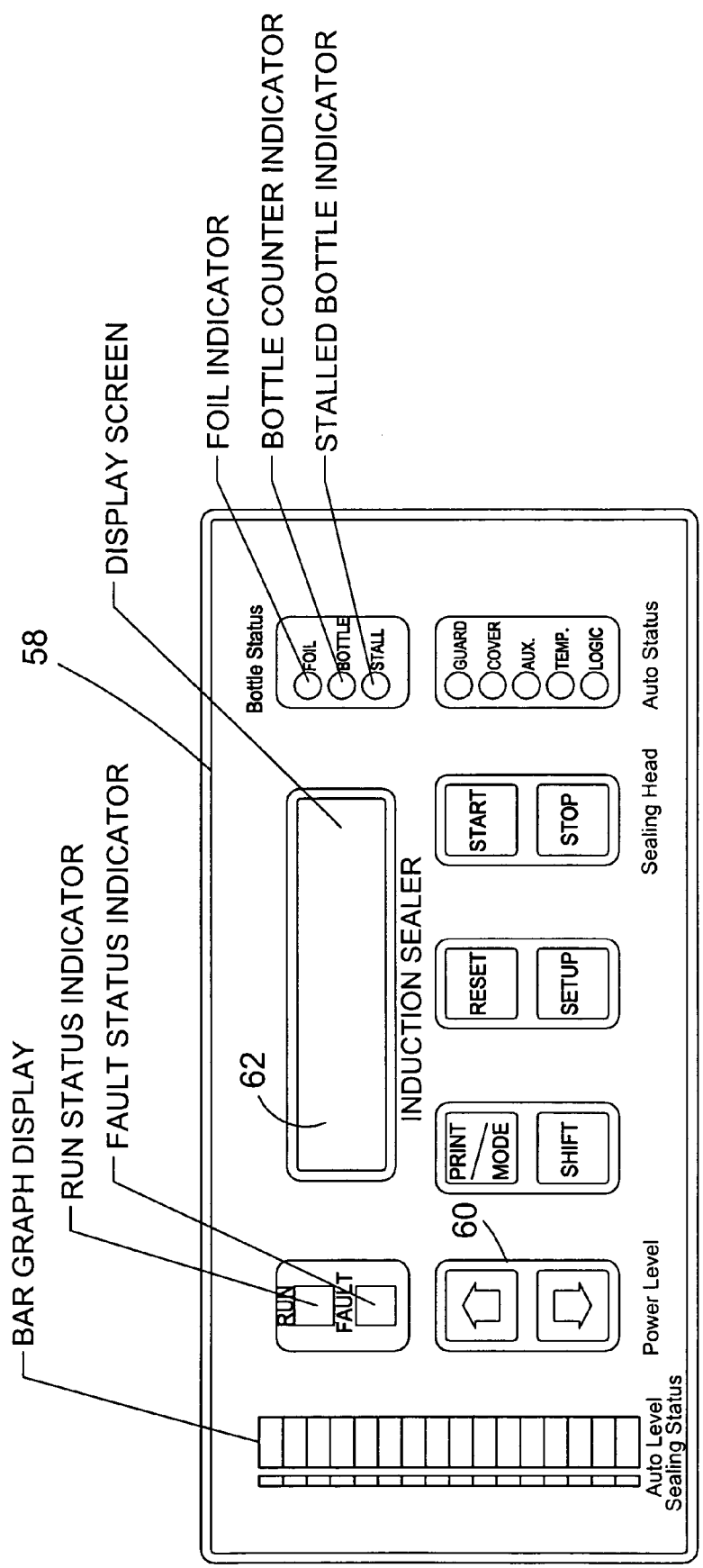
FIG. 6 shows an example of a user interface which may be used in an induction sealer system according to the present invention.

Preferably, the desired speed is determined experimentally and entered into electronic memory location through user interface 58. User interface 58 may be a keyboard. FIG. 6 shows an example of a suitable keyboard that can be used as user interface 58. In the preferred embodiment the up/down keys 60 may be used for selecting the proper speed. Specifically, up/down keys 60 can be used to increase and decrease respectively the desired speed. The value of the desired speed can be used in any known conventional manner to drive conveyor belt 32 at the desired speed. It should be noted that user interface 58 may include visual display 62, which may be an LCD. Visual display 62 is preferably operatively connected to speed monitor and is capable of displaying the speed of conveyor belt 32.

Figure 7:
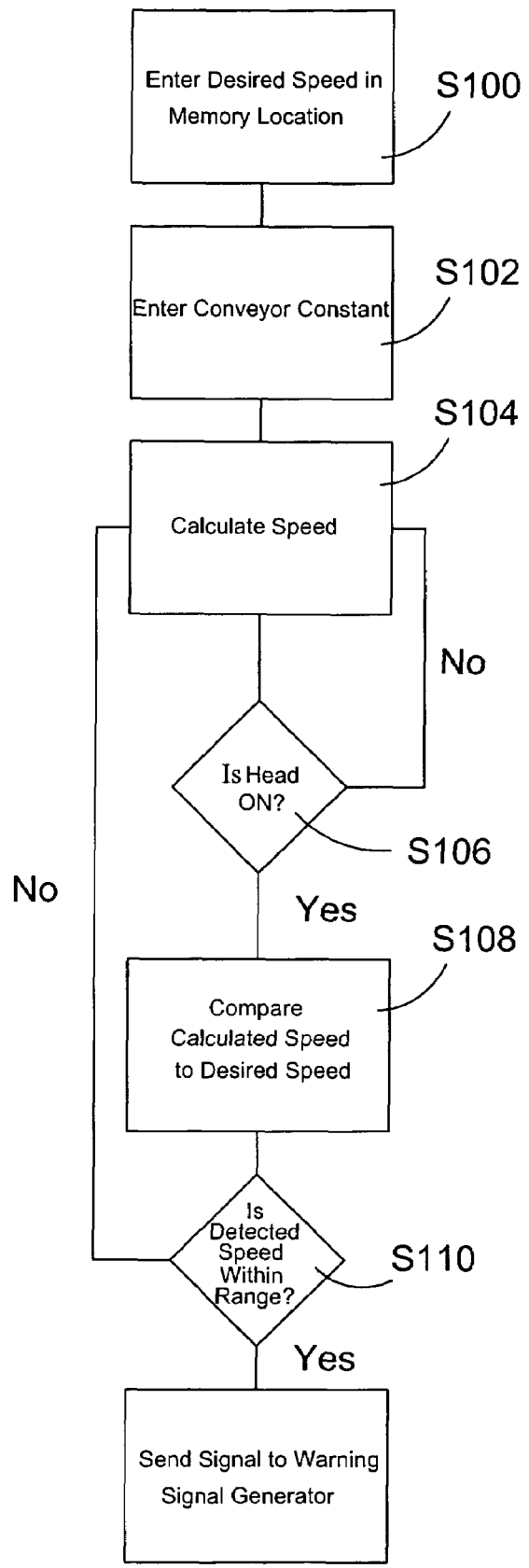
FIG. 7 illustrates a method according to the present invention.

Referring now to FIG. 7, in a method according to the present invention first the desired conveyor speed is determined experimentally and entered into electronic memory location 56 (S100). Next, a conveyor constant is determined and entered into a second electronic memory location (S102). The conveyor constant is used to determine the speed of the conveyor. Specifically, the conveyor constant is multiplied by the number of tics received from optical encoder 34 in order to determine the distance conveyor belt 32 has traveled. The distance is then divided by the elapsed time in order to determine the average speed of conveyor belt 32 during the elapsed time. To determined the elapsed time an external day clock may be employed to provide a signals periodically. For example, a clock may be used that generates a signal every millisecond in order to provide good accuracy. Thus, a fifteen second time lapse provides 15,000 signals from the clock. A microprocessor can then be used to determine the speed based on the time measured by the clock (number of signals from the clock) and the number of tics received from the encoder by dividing the distance measured by the elapsed time.

The conveyor constant is calculated based on the number of encoder tics per unit distance. The number of encoder tics per unit distance is typically supplied by the manufacturer of the optical encoder. If not, the number of tics per unit distance may be determined experimentally.

Once the number of tics per unit distance is known, the conveyor constant may be calculated. Conveyor constant is typically calculated in relation to specific unit of distance. Specifically, if the encoder tics are provided in relation to feet, the conveyor constant is equal to 60,000 divided by the tics/foot. If the encoder tics are provided in relation to meters then the conveyor constant is equal to 195,000 divided by tics/meter. Thus, for example, if the encoder produces 15 tics per foot the conveyor constant is 4000 (60000/15).

The conveyor constant is multiplied with the number of tics received to determine the distance conveyor belt 32 has traveled. The distance so calculated is then divided by the unit time to determine the speed (S104).

Using a conveyor constant is advantageous in that it allows for the use of different optical encoders. That is, the system need not be designed around one specific optical encoder. Rather the encoder may be changed, which allows for flexibility. For example, a higher or a lower resolution optical encoder may be employed as desired.

It is next determined whether induction head 10 is ON (S106). If not, the average speed is measured again. If it is determined that induction head 10 is ON, the determined speed is compared to the desired speed (S108). That is, the desired speed is retrieved from electronic memory 56, and compared to the determined speed to assess whether the determined speed is within a pre-designated acceptable range (S110).

Specifically, for example, in the preferred embodiment of the present invention, the desired speed is subtracted from the determined speed, divided by the desired speed and multiplied by 100 in order to determined the percentage by which the speed of conveyor belt 32 varies from the desired speed. If it is determined that the variance falls outside of a range a fault signal is generated. The fault signal preferably serves to trigger warning signal generator 54. For example, if the variance is more than 5% of the desired speed or less than 5% of the desired speed, a fault signal is generated. If it is determined that the determined speed is within the desired range, the process is returned (S104).

Due in part to the fact that different containers are made from different materials, the desired speed can vary from container to container. Therefore, the desired speed should be determined experimentally.

To determine the proper speed for conveyor belt 32, the speed at which a proper seal is obtained is first determined according to the following procedure.

1. Sealing head 10 is centered with conveyor belt 35 and bottles 16 are run under sealing head 10 such that caps 14 of bottles 16 are positioned near or at the center of sealing head 10.

2. Height of sealing head 10 is set.

3. Conveyor line speed is set. Initially, conveyor speed is set at the slowest possible speed to keep up with production (a slow speed maximizes sealing time).

4. It is ensured that caps 14 of bottles 16 (seal point on bottle) are free of burrs, product, seams, etc.

5. It is ensured that caps 14 of bottles 16 are properly tightened.

6. The power is set at an initial value (e.g. 35%) and a single bottle is subjected to induction heating, and is examined to determine whether it has been sealed. If partially sealed, a new bottle 16 is subjected to induction heating with increased power. If not, the test is conducted again with a 10% power increase. The test is repeated with increasing power until a proper seal is obtained. If after a test the inside of cap 14 of bottle 16 that is being tested is scorched or burned, power is reduced by 5-10% and the test is repeated.

7. A group of bottles is run under sealing head 10 to verify seal quality remains the same in each bottle. If not, step six (6) is repeated.

The steps in Table 1 can be carried out to determine the quality of a seal.

TABLE 1

| | DESCRIPTION | YES | NO |
|---|---|---|---|
| 1 | Was the seal completely cool before removing the cap? | Go to two (2) | Let the cap cool for two (2) minutes before removing the cap |
| 2 | Foil liner melts bottle top? | Reduce power level | Go to three (3) |
| 3 | Was there any burning or scorching of the cap? | Reduce power level | Go to four (4) |
| 4 | Did the wax release from the foil liner and pulp board? | Go to five (5) | Increase power level |
| 5 | Did the liner seal completely around the opening? | Go to six (6) | Increase power level |
| 6 | Does the seal leak? | Increase power level | Go to seven (7) |
| 7 | Drop the bottle or step on an empty bottle with the cap off (plastic bottles only). Does the seal come off the bottle? | Increase power level. | Go to eight (8) |
| 8 | Does the seal release easily (for peel off seals)? | Power level set correctly. | Reduce power slightly |
| 9 | For security liners, is a foil ring left on the bottle? | Power level set correctly | Increase power level |

If power cannot be changed to improve seal quality (e.g. power cannot be lowered beyond a certain minimum), the speed of conveyor belt 32 may be increased in order to limit the amount of power supplied to each container to attain a proper seal. Once a proper seal is attained (either by selection of the proper speed or both), the speed of conveyor belt 32 is recorded. The recorded speed can then be used as the desired speed in order to obtain a proper seal for the containers.

In the preferred embodiment of the present invention factors such as the type of bottle used, the conveyor speed, and other relevant factors may be stored as a "recipe" in a memory location and retrieved when desired. Preferably, information such as the conveyor speed, and other information relevant to obtaining a proper seal as obtained experimentally can be stored as a "recipe" in an electronic location for more than one bottle type so that a cap sealer according to the present invention can be ready to seal a number of bottle types without the necessity of the re-entry of the required information. Thus, for example, when the bottle type is changed, the information relating to that bottle type is retrieved from the memory location and used for sealing.

In the present application a number of references have been made to electronic storage facilities for the storage of data, such as, for example, the conveyor speed. One skilled in the art would recognize that any known electronic storage devices can be used in an apparatus according to the present invention. Thus, for example, information can be stored in a flash memory (erasable memory) which can be part of a microprocessor, or it can be stored in the non-volatile (battery-backed) RAM of, for example, a time keeping chip. Flash allows storage for forty years without having to worry about batteries, and thus is suitable for information that should not be lost (e.g. total hours of machine use, not desirable to lose this time if battery is changed; or recipes settings (e.g. temperature settings) which are not desired to be redone). Other less important information may be kept in, for example, the time keeping chip. To ensure that such information is not lost, a capacitor may be used with stored power to quickly transfer information to the flash memory when the apparatus is powered down in order to avoid losing the data.

It should be noted that the present invention is not limited to induction foil cap sealing, but may be applicable to any manufacturing application in which speed sensing may be considered an important quality assurance factor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An induction sealing system comprising:
   a conveyor to transport a workpiece;
   an induction head disposed over said conveyor to seal said workpiece;
   a speed sensor to sense a speed of said conveyor; and
   a signal generator in communication with said speed sensor to generate a signal when said speed of said conveyor falls outside of a selected range, wherein said selected range includes a value indicative of a desired speed for obtaining a desired seal quality for said workpiece, and wherein said range further includes a value lower than said desired speed and a value higher than said desired speed.

2. An induction sealing system according to claim 1, further comprising a warning signal generator to generate a warning signal in response to a signal from said signal generator.

3. An induction sealing system according to claim 2, wherein said warning signal generator generates an audio signal.

4. An induction sealing system according to claim 2, wherein said warning signal generator generates an optical signal.

5. An induction sealing system according to claim 1, wherein said speed sensor is an optical encoder.

6. An induction sealing system according to claim 1, wherein said selected range includes a value for a speed that is a percentage higher than said desired speed.

7. An induction sealing system according to claim 1, wherein said desired speed is empirically determined.

8. An induction sealing system according to claim 1, wherein said conveyor is either one of a conveyor belt and chain.

9. An induction sealing system comprising:
   an induction head;
   a conveyor to transport a workpiece under said induction head to be sealed;
   an electronic memory that stores a value for a target speed of said conveyor, said target speed being indicative of a desired speed for obtaining a desired seal quality for said workpiece;
   a speed sensor that senses a speed of said conveyor;
   a comparator that compares said speed of said conveyor to said target speed; and
   a signal generator that generates a signal when said speed of said conveyor is outside a predetermined range, wherein said range includes said target speed, a value lower than said target speed and a value higher than said target speed.

10. An induction sealing system according to claim 9, further comprising a warning signal generator to generate a warning signal in response to a signal from said signal generator.

11. An induction sealing system according to claim 10, wherein said warning signal generator generates an audio signal.

12. An induction sealing system according to claim 10, wherein said warning signal generator generates an optical signal.

13. An induction sealing system according to claim 9, wherein said speed sensor is an optical encoder.

14. An induction sealing system according to claim 9, wherein said predetermined range includes a value for a speed that is a percentage higher than said desired speed.

15. An induction sealing system according to claim 9, wherein said desired speed is empirically determined.

16. An induction sealing system according to claim 9, further comprising a user interface for entry of said desired speed into said electronic memory.

* * * * *